US005218167A

United States Patent [19]

Gasque, Jr.

[11] Patent Number: 5,218,167

[45] Date of Patent: Jun. 8, 1993

[54] CABLE ASSEMBLY WITH LIGHTNING PROTECTION

[76] Inventor: Samuel N. Gasque, Jr., 600 E. Harrison St., Dillon, S.C. 29536

[21] Appl. No.: 585,044

[22] Filed: Sep. 17, 1990

Related U.S. Application Data

[63] Continuation-in-part of Ser. No. 568,541, Aug. 14, 1990, abandoned, which is a continuation of Ser. No. 935,782, Nov. 28, 1986, abandoned.

[51] Int. Cl.[5] .............................................. H02G 9/00

[52] U.S. Cl. ........................................ 174/37; 29/854; 174/107; 174/115; 343/840; 343/905

[58] Field of Search .............. 29/854; 174/115, 117 F, 174/117 FF, 37; 343/840, 846, 905

[56] References Cited

U.S. PATENT DOCUMENTS

| | | | |
|---|---|---|---|
| 1,745,096 | 1/1930 | Jayne . | |
| 1,747,214 | 2/1930 | Bennett . | |
| 1,961,859 | 6/1934 | Huth . | |
| 2,064,513 | 12/1936 | Andrews . | |
| 2,218,830 | 10/1940 | Rose et al. . | |
| 3,032,609 | 5/1962 | Timmons | 174/115 |
| 3,297,814 | 1/1967 | McClean et al. | 174/115 X |
| 3,328,510 | 6/1967 | White . | |
| 3,515,948 | 6/1970 | Gutshall . | |
| 3,600,500 | 8/1971 | Schoerner et al. . | |
| 3,614,300 | 10/1971 | Wilson | 174/115 |
| 3,621,118 | 11/1971 | Bunish et al. | 174/115 |
| 3,649,742 | 3/1972 | Tissot . | |
| 3,829,603 | 8/1974 | Hansen et al. | 174/115 |
| 3,919,956 | 11/1975 | Invernizzi . | |
| 4,538,175 | 8/1985 | Balbes et al. | 343/840 X |
| 4,596,047 | 6/1986 | Watanabe et al. | 343/840 X |

OTHER PUBLICATIONS

STV (Satellite Television) Jan. 1985, pp. 90-96 by John Copela.

*Primary Examiner*—Carl J. Arbes
*Attorney, Agent, or Firm*—B. Craig Killough

[57] ABSTRACT

A cable assembly has a cable of conductor assemblies within an insulating envelope, a conducting shield disposed around the cable, a grounding wire outside the shield extending along the length of the shield and in continuous contact with the shield, and an insulating and weatherproof jacket enclosing the shield and the grounding wire. A method for using the cable assembly to connect a satellite television antenna to a receiver in a remote building, providing protection from ground induced lightning, is also disclosed.

2 Claims, 3 Drawing Sheets

CABLE ASSEMBLY WITH LIGHTNING PROTECTION

This application is a continuation-in-part of application Ser. No. 07/568,541, filed Aug. 14, 1990, which is a continuation of application Ser. No. 06/935,782, filed Nov. 28, 1986, both now abandoned.

BACKGROUND OF THE INVENTION

The present invention relates to a cable assembly providing protection from voltage and current surges resulting from lightning strikes. More specifically, the invention relates to a lightning protective burial cable with conductors suitable for connecting a satellite television antenna to a receiver located within a remote building.

A signal received at an outside satellite television antenna is carried to a receiver inside a home, hotel, or other building via a cable often called a direct burial cable because it is underground for most of its length. Such cables are generally round style, including a plurality of conductors arranged around an insulating core and covered with a protective sheath, or flat style, with individually insulated conductors connected in side-by-side relation.

Typically, an antenna system is designed for a nominal operating voltage and current range which is determined in part by the low power levels required by present-day solid-state electronic components. For that reason, satellite antennas are particularly susceptible to lightning strikes. The high voltage or current surge resulting from a direct strike will damage the electronic components of the system, as well as any apparatus electrically connected to the system, such as a television.

Even if the antenna system is not hit directly, it is very susceptible to damage by ground induced lightning (current conducted through the ground). A lightning bolt emits pulsed electromagnetic radiation over a wide frequency spectrum, some of which may be received by the system. Even if a lightning bolt strikes at or near the antenna, the resulting high voltage ground induced currents will be carried through the system wiring and will damage sensitive electronic components at the antenna and in the building. Such components include the television, receiver, modulator, tracking system, and any apparatus connected to the building's electrical wiring.

A satellite antenna is often located at some distance from the building housing the receiver, generally, over one hundred feet away. The AC potential difference between the building and the antenna depends upon the distance between the two, increasing as the distance increases, and tends to increase the susceptibility of the antenna to direct strikes.

Grounding the antenna itself will divert some of the current resulting from a direct strike, but a shunt can still be formed with any connected electronics. Furthermore, a grounding rod at the antenna does not affect the AC potential difference between the building and the antenna, and does not significantly reduce the possibility of damage to the system electronics. Although a grounding wire connected between the antenna and the building eliminates this potential difference, the sensitive electronic components of the system will still be damaged by direct strikes and ground induced strikes.

It is therefore an object of this invention to provide a cable to connect a satellite television antenna to a receiver located within a building.

It is a further object of this invention to provide a cable wherein a grounding wire is combined with a direct burial cable, thus helping protect a system from damage due to voltage and current surges resulting form direct strikes and ground induced lightning strikes.

It is still a further object of this invention to provide a cable which is of simple design, easy to manufacture, and durable in use.

SUMMARY OF THE INVENTION

In one aspect of the invention, one or more of these objects is accomplished by providing a cable assembly of conductor assemblies within an insulating envelope, a conducting shield disposed around the cable, a grounding wire outside the shield extending along the length of the shield and in continuous contact with the shield, and an insulating and substantially weatherproof jacket enclosing the shield and the grounding wire. An optional vapor barrier may be disposed around the cable between the cable and the shield.

In another aspect of the invention, a method for connecting a satellite television antenna to a receiver in a remote building is provided. The method includes providing the cable assembly just described, connecting first ends of the conductor assemblies and the grounding wire to the antenna, connecting the other ends of the conductor assemblies to the receiver, and connecting the grounding wire to a wiring ground of the building.

The invention, together with further objects and attendant advantages, will be best understood by reference to the following detailed description of the embodiment taken in conjunction with the accompanying drawings.

DETAILED DESCRIPTION OF THE PREFERRED EMBODIMENT

Figure 1:
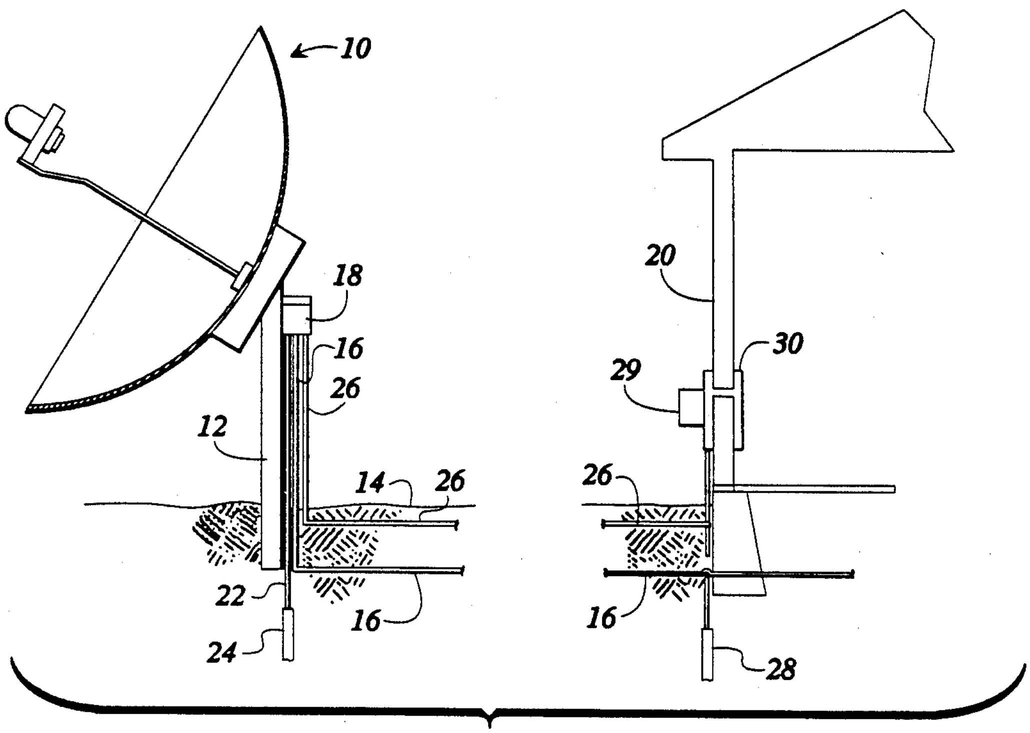
FIG 1 (PRIOR ART)
FIG. 1 is a somewhat schematic elevational view of a typical prior art satellite television antenna installation.

With reference to the drawings, a typical prior art satellite television antenna installation is shown in FIG. 1. An antenna, indicated generally by the numeral 10, is mounted on a post 12 above the surface of ground 14. A direct burial cable 16 extends from a convertor box 18 to a receiver, not shown, within a building 20. An optional grounding wire 22 may be connected between the antenna 10 and a grounding rod 24 driven into the ground adjacent to the antenna 10. An additional grounding wire 26 may be extended from the antenna 10 to a grounding rod 28 of the house AC meter 29, electric panel 30, or to another AC wiring ground at the point of entry of the building 20.

The present invention replaces the direct burial cable 16 and the ground wire 26 with a cable assembly described hereinafter. In the preferred embodiment, the cable assembly includes a flat style cable, indicated generally in FIG. 2 by the numeral 40. The cable 40 has an insulating, weatherproof enevlope 42 extending about and between a plurality of conductor assemblies 44, 46, 48, and 50.

Figure 2:
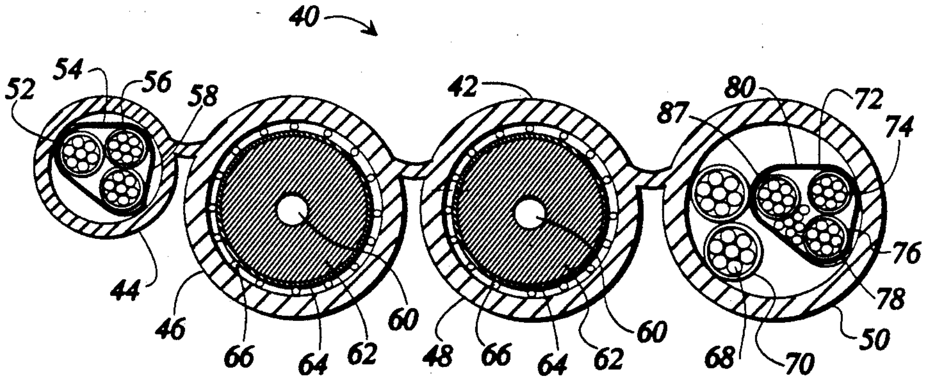
FIG. 2 is a cross-sectional view of a cable of the preferred embodiment of the present invention.

Conductor assembly 44 includes at least one conductor 52 surrounded by an insulating sheath 54, enclosed by a conductive shield 56 and a vapor barrier 58. Although three multi-stranded conductors 52 enclosed by a shield and a vapor barrier are shown in FIG. 2, conductor assembly 44 may include any convenient number of single-stranded or multi-stranded conductors.

Conductor assemblies 46 and 48 each have a conductor 60 surround by an insulating sheath 62, enclosed by a conductive shield 64 and a braided-wire shield 66. Alternatively, conductor assemblies 46 and 48 may be replaced by any convenient number of conductor assemblies.

Conductor assembly 50 includes a plurality of multi-stranded conductors 68 individually surrounded by insulating sheaths 70, grouped with conductor subassembly 72. Conductor subassembly 72 has a multi-stranded conductor 74, and a plurality of multi-stranded conductors 76 individually surrounded by insulating sheaths 78, all enclosed by a conductive shield 80 and a vapor barrier 82. Alternatively, conductor assembly 50 may include any convenient number of multi-stranded conductors 68 and 76.

Conductive shield 56 and vapor barrier 58 of assembly 44, and conductive shield 80 and vapor barrier 82 of assembly 50, may consist of a metallic foil strip with an insulating film of material such as Teflon, Mylar, or the like, deposited on one surface to form a combined shield and vapor barrier. Alternatively, vapor barriers 58 and 82 may take some other form or may be omitted. Conductive shield 64 of assembly 46 may be replaced by a similar integral shield and vapor barrier. The conductors 52, 68, 74, and 76 may be single-stranded or multi-stranded copper wire, as appropriate. Envelope 42 is of some flexible, substantially weatherproof material such as polyvinylchloride. polypropylene, neoprene, or the like.

Figure 3B:
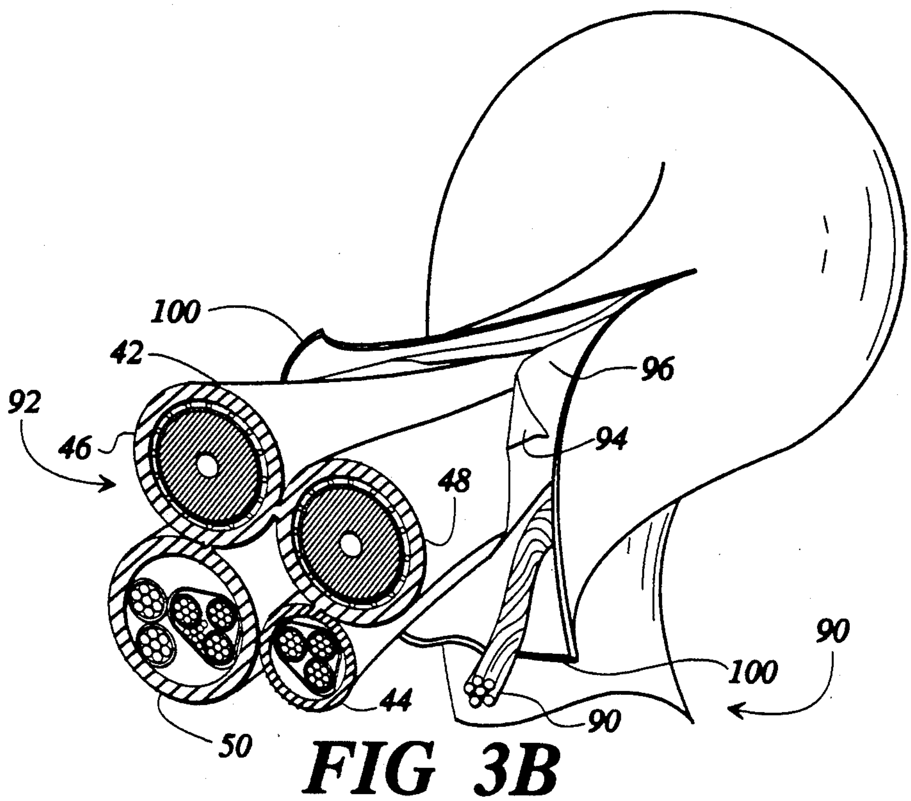
FIG. 3*b* is a perspective, cut-away view of the preferred embodiment of the present invention.
Figure 3A:
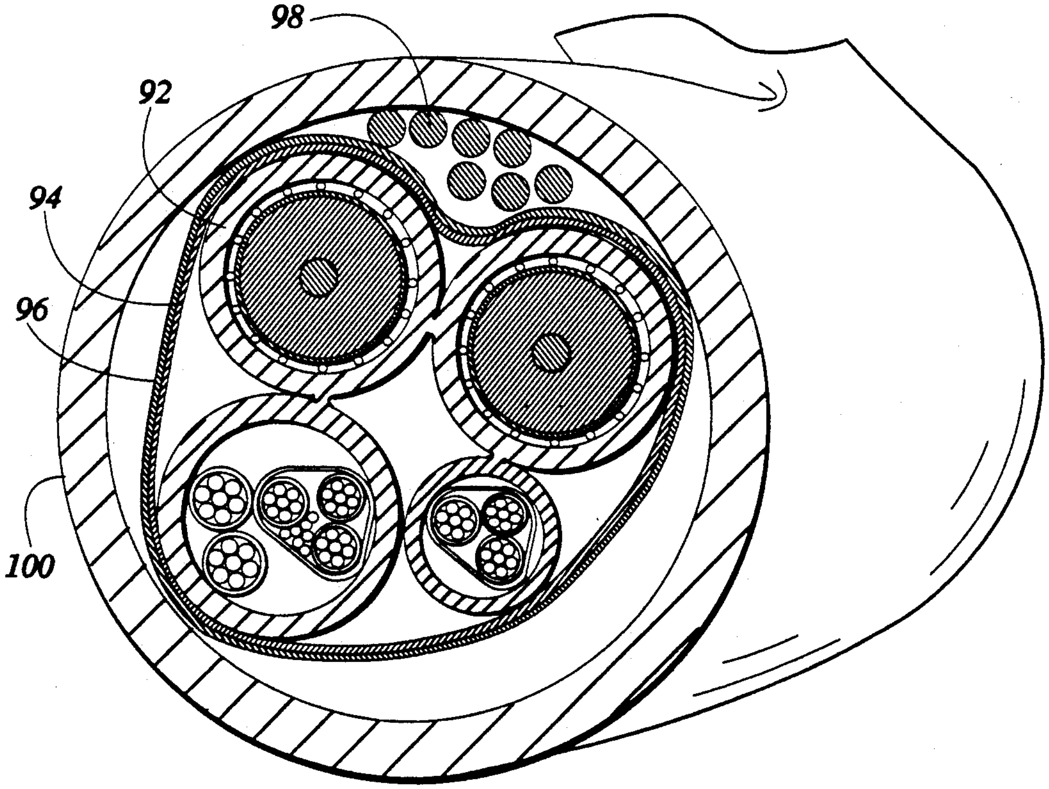
FIG. 3*a* is a cross-sectional view of the preferred embodiment of the present invention including the cable of FIG. 2.

In the preferred embodiment, cable 40 is combined with other elements to form a cable assembly, indicated generally in FIGS. 3*a* and 3*b* by the numeral 90. Cable assembly 90 is used underground between the antenna 10 and the building 20 in place of the combination of the direct burial cable 16 and the grounding wire 26.

Cable assembly 90 is formed as follows: the cable 40 is helically-wound to form cable 92 with an approximately round cross-section and is surrounded by a vapor barrier 94 and a conductive shield 96. A grounding wire 98, outside the conductive shield 96, extends along the length of the shield 96 and is in continuous electrical contact therewith. Grounding wire 98 and shield 96 are enclosed by an insulating, weatherproof jacket 100. FIG. 3*b* shows a perspective, cut-away view of cable assembly 90.

Shield 96 and vapor barrier 94 may be an integral unit consisting of a metallic foil strip with an insulating film of material such as Teflon, Mylar, or the like, deposited on one surface to form a combined shield and vapor barrier. Alternatively, shield 96 and vapor barrier 94 may take some other convenient form, such as a separate vapor barrier and a braided wire shield, or the vapor barrier 94 may be omitted. Jacket 100 is of some flexible, substantially weatherproof material such as neoprene, polyvinylchloride, polypropylene, or the like.

When cable assembly 90 is installed in place of the direct burial cable 16 and the grounding wire 26 of FIG. 1, the cut ends of helically-wound cable 40 may be unwound to their original flat configuration for easy connection to standard bar-type connectors, while the assembly as a whole remains an approximately round, compact whole. One end of the grounding wire 98 is attached to the convertor box 18 or to a separate ground at the antenna 10, and the other end is attached to the grounding rod 28 or electric panel 30 in the building 20. The conductors of the cable assembly 90 are connected to corresponding terminals of the antenna 10 and a receiver within the building 20.

Cable assembly 90 thus combines a grounding wire with a shielded cable suitable for connecting a satellite antenna to a remote receiver. This configuration is particularly convenient and compact and provides greater protection for the satellite antenna system—and any apparatus connected to the system—than wiring systems employing a separate grounding wire.

Figure 4:
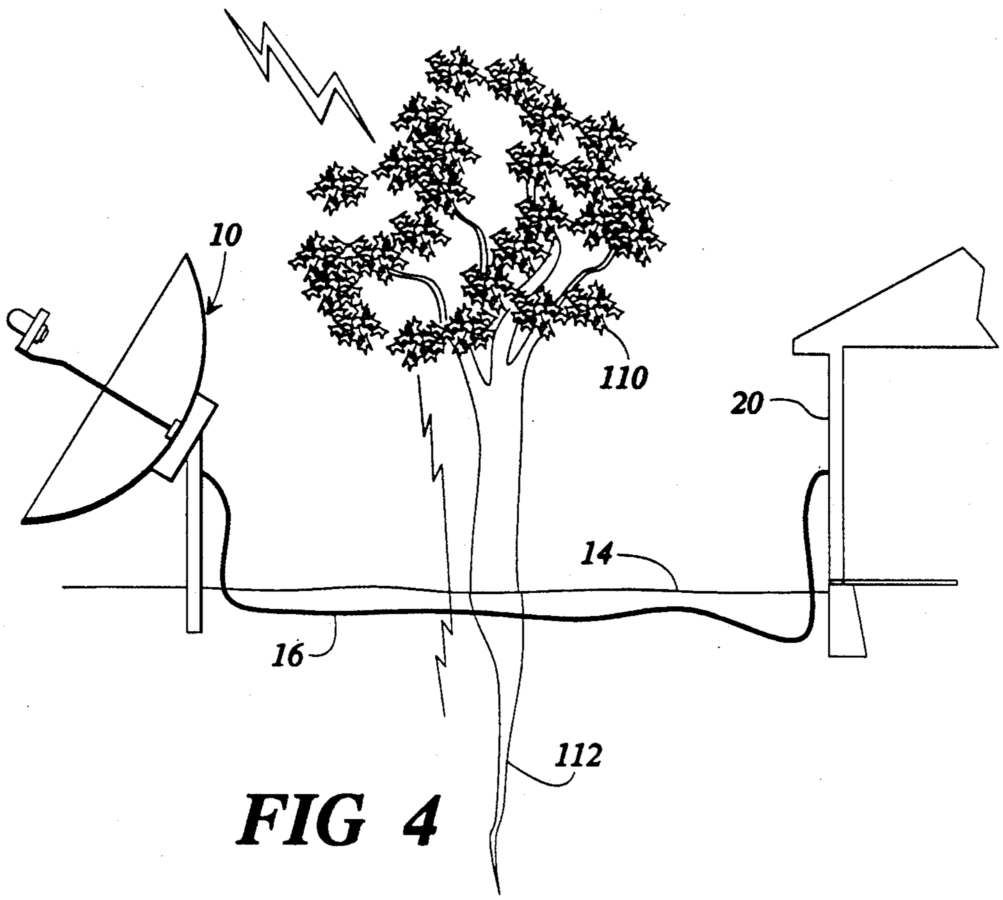
FIG. 4 is a schematic elevational view of a typical prior art satellite television antenna installation, illustrating ground induced lightning.
Figure 5:
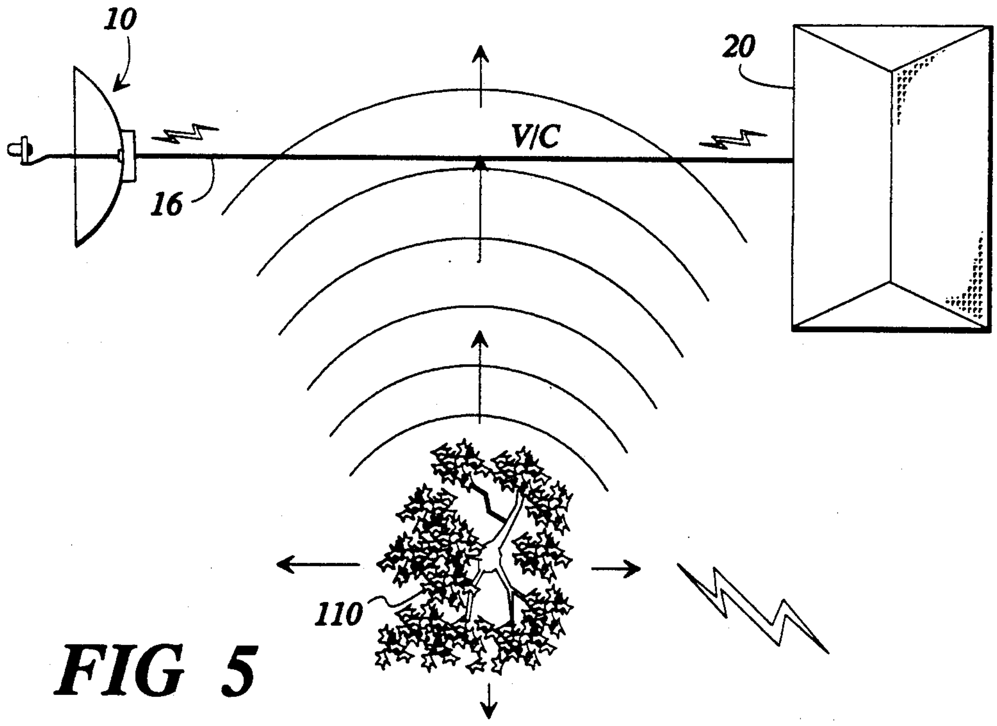
FIG. 5 is a schematic plan view of the satellite television antenna installation of FIG. 4.

FIGS. 4 and 5 illustrate the risk to a typical satellite television antenna system from voltage and current surges known as ground induced lightning. Many trees, such as pine tree 110,have roots 112 that grow generally downward, providing a natural grounding rod. When lightning strikes such trees, voltage and current is transmitted through the ground in all directions, as illustrated. Such ground induced lightning easily enters the unprotected burial cable 16 and is quickly routed to electronic components at the antenna 10 and the receiver in the house 20, causing severe damage.

The addition of a separate grounding wire 26 as illustrated in FIG. 1, provides only a limited protection against such ground induced lightning. The burial cable 16 is still unprotected from the voltage and current surges conducted through the ground, which may be at least 200,000 amperes and millions of volts.

Unlike the system of FIG. 1 having a separate grounding wire 26, the cable assembly 90 includes shield 96 that intercepts the ground induced lightning and keeps the voltage and current surges from the conductors assemblies 44, 46, 48 and 50. The grounding wire 98 safely drains the high voltage current away from the conductor assemblies to the grounding rod 24 and the grounding rod 28. Because the grounding wire 98 is outside the shield 96 and is in continuous contact with the shield, there is little likelihood that the shield will be burned through, even by an extremely strong and nearby lightning strike.

It will be understood that other materials and configurations of conductors than the preferred embodiment shown may be used without deviating from the spirit of the present invention. In particular, some other convenient flat style cable may be treated as described, to form cable assembly 90. Furthermore, any convenient form of cable may be surrounded by a vapor barrier and conductive shield, with a grounding wire outside the shield extending along the length of the shield, and an insulating, weatherproof jacket enclosing the whole, to form the cable assembly of the present invention.

From the foregoing, it will be apparent that the present invention provides a novel cable assembly with protection from voltage and current surges resulting from lightning strikes that is particularly suitable for installing a remote satellite television antenna, or similar equipment.

Of course, it should be understood that various changes and modifications to the preferred embodiment described above will be apparent to those skilled in the art. Additionally, various embodiments of the present invention may be adapted for specific system applications other than satellite television antenna systems. The present invention is not intended to be limited to use only in the form of the preferred embodiment or with only satellite television antenna systems. It is therefore intended that the foregoing detailed description be regarded as illustrative rather than limiting and that it be understood that it is the following claims, including all equivalents, that are intended to define the scope of this invention.

I claim:

1. An electrical cable assembly, comprising:

a) a cable having at least two conductor assemblies, at least one of which comprises at least two conductors, and having an insulating envelope disposed about said conductor assemblies;

b) a conducting shield disposed around said cable;

c) a grounding wire outside said shield and said cable extending along the length of the shield and in continuous electrical contact therewith, wherein one end of said grounding wire is attached to a conductive grounding rod, a portion of which extends underground; and d) an insulating and substantially weather proof jacket enclosing said shield and said grounding wire;

wherein a portion of an electrical cable assembly so comprised is buried underground.

2. An electrical cable assembly as described in claim 1 wherein an end of said grounding wire opposite said end which is attached to said grounding rod is attached to a satellite television antenna.

* * * * *